(12) United States Patent
Liang et al.

(10) Patent No.: US 11,967,708 B2
(45) Date of Patent: Apr. 23, 2024

(54) LITHIUM ION BATTERY NEGATIVE ELECTRODE MATERIAL AND PREPARATION METHOD THEREFOR

(71) Applicant: BTR NEW MATERIAL GROUP CO., LTD., Guangdong (CN)

(72) Inventors: Tengyu Liang, Guangdong (CN); Chunlei Pang, Guangdong (CN); Jianguo Ren, Guangdong (CN); Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 375 days.

(21) Appl. No.: 16/760,550

(22) PCT Filed: Nov. 29, 2018

(86) PCT No.: PCT/CN2018/118101
§ 371 (c)(1),
(2) Date: Apr. 30, 2020

(87) PCT Pub. No.: WO2019/114555
PCT Pub. Date: Jun. 20, 2019

(65) Prior Publication Data
US 2021/0226202 A1    Jul. 22, 2021

(30) Foreign Application Priority Data
Dec. 12, 2017 (CN) .......................... 201711318537.2

(51) Int. Cl.
*H01M 4/48* (2010.01)
*H01M 4/36* (2006.01)
(Continued)

(52) U.S. Cl.
CPC .......... *H01M 4/483* (2013.01); *H01M 4/366* (2013.01); *H01M 4/587* (2013.01);
(Continued)

(58) Field of Classification Search
None
See application file for complete search history.

(56) References Cited

U.S. PATENT DOCUMENTS

2016/0079591 A1\* 3/2016 Yang ................. C04B 35/62839
427/122
2018/0151868 A1\* 5/2018 Kim ....................... H01M 4/382

FOREIGN PATENT DOCUMENTS

CN   103151503   6/2013
CN   103608952   2/2014
(Continued)

OTHER PUBLICATIONS

International Search Report issued in related PCT/CN2018/118101, dated Mar. 6, 2019.
(Continued)

*Primary Examiner* — Wyatt P McConnell
(74) *Attorney, Agent, or Firm* — McCoy Russell LLP

(57) ABSTRACT

Disclosed are a lithium ion battery negative electrode material and a preparation method therefor. The negative electrode material comprises $SiO_y$ (0.2<y<0.9) and an M compound, wherein M is a metal. The method of the present application comprises: subjecting a raw material comprising a $SiO_x$ material and the metal M to a redox reaction, wherein the O/Si ratio, i.e. x, of the $SiO_x$ (0.5<x<1.5) material is adjusted to y (0.2<y<0.9), and at the same time, the metal M is oxidized to obtain the M compound.

18 Claims, 1 Drawing Sheet

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

FOREIGN PATENT DOCUMENTS

| | | |
|---|---|---|
| CN | 104701509 | 6/2015 |
| CN | 106356508 | 1/2017 |
| CN | 108054366 | 5/2018 |
| JP | 2011051844 | 3/2011 |
| JP | 2012033317 A | 2/2012 |
| JP | 2016522139 A | 7/2016 |
| JP | 2017199657 A | 11/2017 |
| KR | 20050058505 A | 6/2005 |
| KR | 101586816 B1 | 1/2016 |
| KR | 1022379490000 A | 4/2022 |
| WO | 2017052278 A1 | 3/2017 |

OTHER PUBLICATIONS

European Search Report issued in European Patent Application No. 18887516.5 dated Aug. 5, 2021.
Korean Office Action dated Dec. 14, 2021 in Korean Application No. 10 2020 7006458 and its English translation.
Korean Intellectual Property Office, Office Action Issued in Application No. 10-2022-7016060, dated Mar. 13, 2023, 20 pages. (Submitted with Machine Translation).
Huang, P., "Principle of Powder Metallurgy," Metallurgical Industrial Press, 2nd Edition, Nov. 30, 1982, 13 pages.
State Intellectual Property Office of the People's Republic of China, Office Action and Search Report Issued in Application No. 202111320161.5, May 12, 2023, 10 pages. (Submitted with Partial Translation).

* cited by examiner

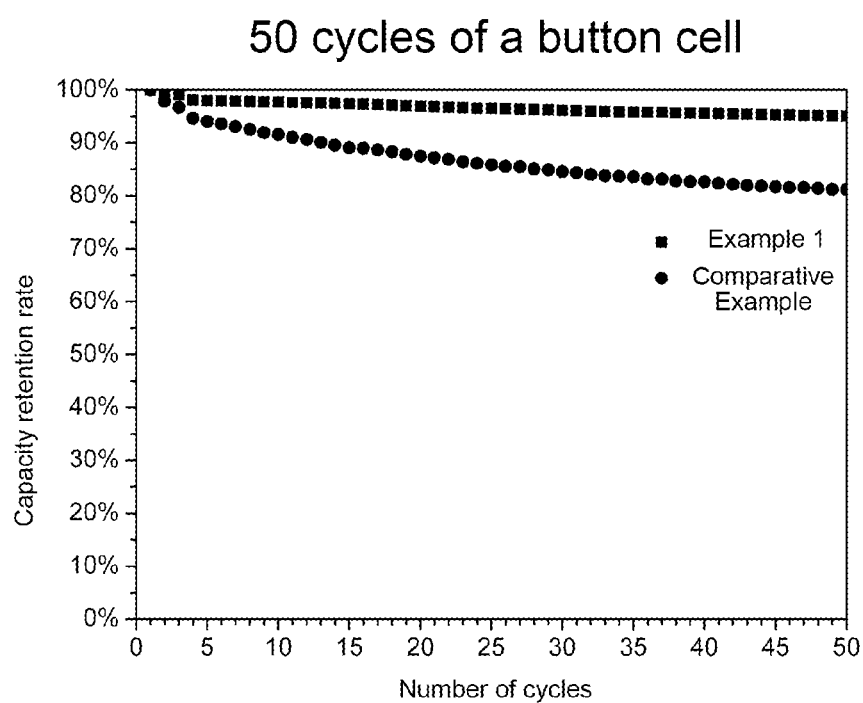

LITHIUM ION BATTERY NEGATIVE ELECTRODE MATERIAL AND PREPARATION METHOD THEREFOR

TECHNICAL FIELD

The present application belongs to the field of lithium ion battery anode materials, relates to an anode material of lithium ion battery and a preparation method therefor, for example, to a silicon monoxide anode material of lithium ion battery and a preparation method therefor.

BACKGROUND

Along with rapid development of electric vehicles and other electronic products, increasingly high requirements are put forward on electric energy storage. Lithium ion batteries become ideal portable batteries at present due to their characteristics such as high working voltage, light weight, small self-discharge, long cycle life, no memory effect, no environmental pollution and good safety performance. At present, the commercial lithium ion batteries predominantly employ graphite as an anode material, which has the theoretical specific capacity that cannot meet the increasing demands of the future energy storage field, thus it is urgent to develop a new generation of high-performance anode materials. Although Si has pretty high lithium intercalation capacity up to 4,200 mAh·g$^{-1}$, the volume effect is up to 300% during the lithium intercalation and de-intercalation of Si, so that the lattice structure of Si collapses, Si particles undergoes pulverization, and active substances are detached from a current collector, resulting in rapid decay of capacity during cycling, and thereby preventing the Si from being applied to practical application as a lithium ion battery anode. SiO$_x$ has a structure where amorphous nano Si and amorphous SiO$_2$ are surrounded by a framework composed of low-value oxides of Si, which relieves the volume effect of Si and provides SiO$_x$ the advantages of lower expansion and longer service life than Si material, and thus is beneficial to develop lithium ion batteries with higher capacity density and longer service life, and is now commoditized.

Nevertheless, the first coulombic efficiency of SiO$_x$ is relatively low, about 75%. As generally believed, SiO$_x$, at its first lithium intercalation, undergoes the following reactions:

$$SiO+2Li^++2e^- \rightarrow Li_2O+Si \quad (1)$$

$$4SiO+4Li^++4e^- \rightarrow Li_4SiO_4+3Si \quad (2)$$

$$Si+4.4Li^++4.4e^- \rightarrow Li_{4.4}Si \quad (3)$$

The formula (1) and formula (2) are irreversible reactions, wherein more lithium ions are consumed for the generation of Li$_2$O and Li$_4$SiO$_4$, resulting in relatively low first coulombic efficiency of SiO$_x$. In order to increase the first coulombic efficiency of SiO$_x$, it is necessary to reduce the oxygen content in the SiO$_x$ system, and thereby to reduce the irreversible capacity caused by the reactions of formula (1) and formula (2). Since the SiO material requires a low-value oxide framework of Si to alleviate the expansion, the system of SiO$_x$ per se cannot be destroyed while the oxygen content is reduced.

Patent CN201310154328 discloses a preparation method of anode material of lithium ion battery with high first coulombic efficiency, which method adopts LiH to pre-intercalate lithium into SiO$_x$ material, significantly improving the first coulombic efficiency of SiO$_x$ material. However, LiH, as a substance that is flammable and explosive when exposed to water, has great potential safety hazard and is not easy to realize large-scale industrial production.

Patent CN201110149645 discloses a method for preparing porous silicon by magnesiothermic reduction, which is technically characterized in that SiO$_x$ is thoroughly reduced by using a large amount of magnesium to prepare a porous silicon material. This material belongs to a Si material, and the oxide framework of SiO$_x$ per se thereof is completely destroyed, which cannot ensure the advantage of low expansion and is not the same system as that of the SiO$_x$ anode material.

Patent CN201610863902.7 discloses a method for preparing a silicon oxide-containing composite, which is technically characterized in that SiO vapor and a metal vapor are reacted in a gas phase manner and condensed under a negative pressure environment. This method requires a vacuum environment and a temperature capable of gasifying SiO, has higher requirements on equipment and energy sources. Accordingly, a scheme which can be implemented by simple equipment under normal pressure is needed.

Si materials have an advantage of extremely high capacity over graphite. However, the expansion of up to 300% inhibits the practical application of Si materials. Although the Si material with high specific surface area such as porous silicon has relieved expansion to some extent by a space-reserving manner, the increase of the specific surface area thereof would increase side reactions thereof with the electrolyte, which in turn leads to consuming more active materials to form an SEI film, as well as the poor electrical contact between particles. SiO$_x$ materials have a structure where nano Si and amorphous SiO$_2$ are wrapped by a framework of low-value oxide of Si. Si is dispersed throughout the framework in relatively small crystallite grain sizes. The nano Si with relatively smaller grain sizes has smaller expansion per se. In addition, the rigid framework not only inhibits the expansion of the nano Si, but also prevents the nano particles from agglomerating during cycling. Therefore, SiO$_x$ materials display advantages of excellent cycle and expansion over Si materials, especially in later cycle.

Hence, it is a technical puzzle in the art to substantially improve the first coulombic efficiency of the SiO$_x$ anode material safely and inexpensively by using simple and common equipment and mild reaction conditions and to realize its industrialization on the premise of maintaining the system structure of the SiO$_x$ anode material per se and ensuring lower volume effect and better cycle performance.

SUMMARY

The following is a brief summary of the subject matter that will be described in greater detail herein. The summary is not intended to be limiting as to the protection scope of the claims.

The present application aims to provide an anode material of lithium ion battery and a preparation method thereof, in particular to a silicon monoxide anode material of lithium ion battery and a preparation method thereof. The battery made from the anode material of lithium ion battery according to the present application has high first capacity, high first coulombic efficiency, good cycle performance and small volume effect.

In a first aspect, the present application provides an anode material of lithium ion battery, in particular a silicon monoxide anode material, comprising SiO$_y$ and an M compound, with M being a metal;

wherein 0.2<y<0.9.

In the present application, $SiO_y$ (0.2<y<0.9) maintains a good oxide framework with the advantage of low expansion.

In the present application, the "M compound" refers to a substance into which the metal M is converted after redox reaction.

In the present application, $SiO_y$ (0.2<y<0.9) serves as a major constituent, wherein y is, for example, 0.25, 0.3, 0.4, 0.45, 0.5, 0.55, 0.6, 0.65, 0.7, 0.8 or 0.85 and the like.

The battery comprising the anode material of lithium ion battery according to the present application has high first capacity, high first coulombic efficiency, good cycle performance and small volume effect. On condition that it is charged and discharged at 0.005V-1.5V, the first capacity is more than 1,250 mAh/g, the first coulombic efficiency is more than 80%, the capacity retention after 50 cycles is more than 90%, and the volume effect is small, and the expansion rate of the electrode plate is less than 50%. In addition, silicon monoxide anode materials with various first capacities and first coulombic efficiencies can be obtained by regulating process parameters depending on actual demands.

Optionally, the M is an active metal with a pauling electronegativity of <1.8. Optionally, it comprises any one selected from the group consisting of metal Na, metal K, metal Mg, metal Ca and metal Al, or a combination of at least two selected therefrom.

As an optional technical solution of the present application, the M compound is contained in an amount of 1%-60% by mass percentage, e.g. 1%, 3%, 5%, 8%, 10%, 12.5%, 15%, 20%, 25%, 27.5%, 30%, 33%, 36%, 40%, 45%, 50%, 55% or 60% and the like, based on the total mass of the anode material being 100%. In the case that the mass percentage content is less than 1%, the first coulombic efficiency of the prepared $SiO_y$ will be increased by a too small amplitude than that of $SiO_x$. In the case that the mass percentage content is more than 60%, the $SiO_x$ will be thoroughly reduced into elementary Si, the oxide skeleton of the silicon monoxide material per se will be completely destroyed, and the characteristic of low expansion of the silicon monoxide material will be lost.

Optionally, the anode material has a specific surface area of <50 m$^2$/g, e.g. 1 m$^2$/g, 3 m$^2$/g, 5 m$^2$/g, 7 m$^2$/g, 10 m$^2$/g, 15 m$^2$/g, 20 m$^2$/g, 22 m$^2$/g, 25 m$^2$/g, 30 m$^2$/g, 32 m$^2$/g, 35 m$^2$/g, 40 m$^2$/g, 45 m$^2$/g or 50 m$^2$/g and the like, optionally 1.0 m$^2$/g-15.0 m$^2$/g. The first coulombic efficiency is relatively low in the case that the specific surface area is more than 50 m$^2$/g, and the specific surface area is optionally ≤15 m$^2$/g.

Optionally, the Si crystallite grains in the $SiO_y$ have a size of ≤100 nm, e.g. 1 nm, 5 nm, 10 nm, 12 nm, 15 nm, 20 nm, 25 nm, 28 nm, 30 nm, 40 nm, 45 nm, 50 nm, 55 nm, 60 nm, 70 nm, 80 nm, 90 nm or 100 nm and the like. Poor cycle performance is caused in the case that the size of the Si crystallite grains is larger than 100 nm, and the Si crystallite grains optionally have a size of ≤20 nm.

As an optional technical solution of the method according to the present application, the anode material further comprises any one selected from the group consisting of amorphous carbon coating, graphite, carbon black, carbon nanotubes, graphene, silicon, and a metal compound, or a combination of at least two selected therefrom.

Optionally, the metal compound comprises any one selected from the group consisting of a metal oxide, a metal silicide, and a metal silicate, or a combination of at least two selected therefrom, optionally comprises any one selected from the group consisting of $K_2O$, $Na_2O$, MgO, CaO, $Al_2O_3$, $Mg_2Si$, $Ca_2Si$, $Al_4Si_3$, $K_2SiO_3$, $K_4SiO_4$, $K_2Si_2O_5$, $Na_2SiO_3$, $Na_4SiO_4$, $Na_2Si_2O_5$, $Mg_2SiO_4$, $MgSiO_3$, $Ca_2SiO_4$, $CaSiO_3$, $Al_4(SiO_4)_3$, and $Al_2(SiO_3)_3$, or a combination of at least two selected therefrom.

In a second aspect, the present application provides a method for preparing the anode material of lithium ion battery according to the first aspect, which is also a modification method, comprising:

redox reaction is performed on a raw material containing the $SiO_x$ material and the metal M, with the result that the O/Si ratio, i.e. x, of the $SiO_x$ material is adjusted to y, while the metal M is oxidized to obtain an M compound;

wherein, 0.5<x<1.5, 0.2<y<0.9, and y<x, e.g. x=0.6, y=0.25; x=0.75, y=0.4; x=0.8, y=0.4; x=0.9, y=0.45; x=1.0, y=0.5; x=1.2, y=0.8; x=1.5, y=0.85 and the like.

In the present application, the y value is controllable, which can be realized by regulating process parameters depending on various actual requirements.

As an optional technical solution of the method according to the present application, the method comprises the following steps:

(1) the raw material containing the $SiO_x$ material is mixed with the metal M uniformly, then the mixture is subjected to heat treatment and heat preservation under a non-oxidizing atmosphere to obtain $SiO_y$ as a reduction product and a M compound as an oxidation product;

wherein the metal M is contained in an amount of 3%-40% by mass percentage based on the total mass of the raw material containing the $SiO_x$ material and the metal M being 100%;

(2) the products obtained in step (1) are subjected to acid treatment by using an acid for dissolving and partially removing the M compound, and a lithium ion battery material comprising $SiO_y$ and the M compound is obtained;

wherein 0.5<x<1.5, 0.2<y<0.9, and y<x.

In the present application, the metal M in step (1) is contained in an amount of 3%-40% by mass percentage, e.g. 3%, 4%, 6%, 10%, 13%, 15%, 20%, 22.5%, 25%, 30%, 35% or 40% and the like. In an optional technical solution, the mass percentage content of the metal M is controlled to be 3-40%, and the mixing ratio is recorded as m, which can control the adjustment of the O/Si ratio, i.e. x, of the $SiO_x$ material to y, wherein 0.5<x<1.5, 0.2<y<0.9, and y<x.

As an optional technical solution of the method according to the present application, the method further comprises the steps of liquid-solid separation and washing and drying the separated solid phase after the acid treatment.

Optionally, the liquid-solid separation manner comprises but is not limited to any one selected from the group consisting of centrifugal separation and filtration separation.

Optionally, the drying manner comprises but is not limited to any one selected from the group consisting of baking at high temperature and freeze drying.

As an optional technical solution of the method according to the present application, the method further comprises using the product of step (1) and/or the product of step (2) as the raw material for step (1) and repeating the following steps: step (1), or step (1) and step (2) in sequence. By repeating the aforementioned steps, the first coulombic efficiency of the finally obtained anode material can be higher. The times of repetition is optionally 0-5 times, e.g. 0 time, 1 time, 2 times, 3 times, 4 times or 5 times, wherein the "0 time" indicates no repeating operation, and optionally 1 time.

Optionally, the Si crystallite grains in the raw material comprising the $SiO_x$ material in step (1) have a size of ≤100 nm, e.g. 1 nm, 5 nm, 10 nm, 15 nm, 20 nm, 25 nm, 30 nm, 40 nm, 45 nm, 55 nm, 60 nm, 70 nm, 80 nm, 90 nm or 100 nm and the like, optionally ≤20 nm.

As an optional technical solution of the method according to the present application, the raw material containing the $SiO_x$ material in step (1) further contains an additive to form a $SiO_x$-based composite material with the $SiO_x$ material, wherein the additive is any one selected from the group consisting of amorphous carbon coating, graphite, carbon black, carbon nanotubes, graphene, silicon, and a metal salt, or a combination of at least two selected therefrom.

Optionally, the amorphous carbon coating is contained in an amount of 1%-20% by mass percentage, e.g. 1%, 2%, 3%, 5%, 8%, 10%, 12%, 15%, 18%, 19% or 20% and the like, based on the total mass of $SiO_x$-based composite material being 100%.

Optionally, the raw material containing the $SiO_x$ material is any one selected from the group consisting of $SiO_x$ powder and $SiO_x$-based composite material, or a combination of two selected therefrom.

Optionally, the metal M in step (1) is an active metal with a pauling electronegativity of ≤1.8. Optionally, it comprises any one selected from the group consisting of metal Na, metal K, metal Mg, metal Ca and metal Al, or a combination of at least two selected therefrom.

Optionally, the metal M has a particle size D50 of ≤300 μm, e.g. 300 μm, 275 μm, 260 μm, 240 μm, 220 μm, 200 μm, 180 m, 150 μm, 120 μm, 100 μm or 50 μm, 20 μm or 10 μm, and the like.

Optionally, the device used for mixing in step (1) is any one selected from the group consisting of a VC mixer, a multi-dimensional mixer, a mechanical fusion machine, a powder agitator and a ball mill.

Optionally, the non-oxidizing atmosphere in step (1) comprises any one selected from the group consisting of a nitrogen gas atmosphere, an argon gas atmosphere, a neon gas atmosphere, and a helium gas atmosphere, or a combination of at least two selected therefrom.

Optionally, the gas pressure during the heat treatment in step (1) is 0.01 MPa-1 MPa, e.g. 0.01 MPa, 0.02 MPa, 0.05 MPa, 0.08 MPa, 0.1 MPa, 0.15 MPa, 0.2 MPa, 0.3 MPa, 0.35 MPa, 0.4 MPa, 0.5 MPa, 0.6 MPa, 0.7 MPa, 0.8 MPa or 1 MPa, and the like, optionally 0.1 MPa.

Optionally, the heat treatment temperature in step (1) is 550° C. -1100° C., e.g. 550° C., 600° C., 650° C., 675° C., 700° C., 725° C., 735° C., 750° C., 770° C., 780° C., 800° C., 850° C., 880° C., 900° C., 925° C., 950° C., 1,000° C., 1,050° C. or 1,100° C., and the like.

Optionally, the heat preservation time in step (1) is 0.5 h-24 h, e.g. 0.5 h, 1 h, 2 h, 3 h, 4 h, 6 h, 8 h, 9 h, 10 h, 12 h, 13.5 h, 15 h, 18 h, 19 h, 20 h, 22 h or 24 h, and the like.

Optionally, the equipment used for the heat treatment is any one selected from the group consisting of a box-type furnace, a rotary furnace, a tube furnace, a heating mixer, a roller kiln, a pusher kiln, an autoclave and a vacuum furnace.

Optionally, the acid used during the acid treatment in step (2) is an acid capable of dissolving the M compound, and comprises any one selected from the group consisting of hydrochloric acid, sulfuric acid, nitric acid, perchloric acid, formic acid, and acetic acid, or a combination of at least two selected therefrom.

Optionally, the acid treatment time is 0.2 h-24 h, e.g. 0.2 h, 0.5 h, 1 h, 3 h, 5 h, 6 h, 8 h, 10 h, 12 h, 15 h, 18 h, 20 h, 21.5 h or 24 h, and the like, optionally 0.2 h-4 h.

Optionally, after the acid treatment, the residual M compound accounts for 1%-60% of the total mass of the lithium ion battery material. The limitation to this range is on account of avoiding overlarge specific surface area of the material due to full dissolution of the M compound and also avoiding too low capacity of the material due to too little dissolution of the M compound. Either full or too little dissolution will degrade the final electrochemical performance of the material.

As an optional technical solution of the method according to the present application, the method comprises the following steps:

(1) the raw material containing the $SiO_x$ material is mixed with the metal M uniformly, then the mixture is subjected to heat treatment at 550° C. and heat preservation for 0.5 h-24 h under a non-oxidizing atmosphere to obtain $SiO_y$ as a reduction product and a M compound as an oxidation product;

wherein the metal M is contained in an amount of 3%-40% by mass percentage based on the total mass of the raw material containing the $SiO_x$ material and the metal M being 100%;

(2) the products obtained in step (1) are subjected to acid treatment by using an acid for dissolving and partially removing the M compound, wherein the treatment time is controlled during the acid treatment so that the residual quantity of the M compound accounts for 1-60% of the total mass of the materials, avoiding overlarge specific surface area of the material due to full dissolution of the M compound; then liquid-solid separation is conducted, followed by washing to be neutral and drying, and a lithium ion battery material comprising $SiO_y$ and the M compound is obtained;

wherein $0.5<x<1.5$, $0.2<y<0.9$, and $y<x$.

As compared to the related art, the present application has the following beneficial effects:

(1) The present application prepares the anode material of lithium ion battery through reducing and deoxidizing the $SiO_x$ ($0.5<x<1.5$) anode material by using an active metal, which effectively and inexpensively reduces the oxygen content in the $SiO_x$ system to y ($0.2<y<0.9$), so that the first coulomb efficiency thereof is improved; meanwhile, the obtained anode material also contains the M compound, and $SiO_y$ contains Si crystallite grains. The anode material prepared by the method according to the present application maintains the structure of the $SiO_x$ system per se, and inherits the advantage of excellent cyclic expansion performance of the $SiO_x$ material per se.

(2) The raw materials and devices adopted by the method according to the present application are common and easily accessible, and the reaction conditions are mild, so that the method according to the present application is simple, economical and easy to be industrialized.

(3) The anode material according to the present application comprises $SiO_y$ ($0.2<y<0.9$) and an M compound, wherein M is a metal, and Si crystallite grains are contained in $SiO_y$. This anode material has relatively high first coulombic efficiency, and the irreversible phases $Li_2O$ and $Li_4SiO_4$ are generated in reduced amounts during the first lithium intercalation due to the reduced O content of the anode; moreover, the material has excellent cyclic expansion performance and is beneficial to the development of batteries with high energy density.

Other aspects will become apparent upon reading and understanding the detailed description and the accompanying drawings.

BRIEF DESCRIPTION OF THE DRAWINGS

FIG. 1 is a graph showing the capacity retentions of the button cells after 50 cycles of Example 1 and comparative example.

DETAILED DESCRIPTION

The technical solution of the present application is further explained by the following specific embodiments in combination with the accompanying drawings.

Material Characterization Methods:

the characterization method for the O content of the material is as follows: firstly the material was treated by using concentrated HCl for 24 hours, then the acid liquor was separated and the filter residue was baked; then X-ray diffraction spectrum thereof was checked; after the absence of any diffraction peak of metal salts was confirmed, the filter residue was characterized by using an N/H/O analyzer.

x in the material $SiO_x$ was calculated from the O content characterized by the above method in accordance with x=O content ×16/(28+O content ×16).

y in the material $SiO_y$ was calculated from the O content characterized by the above method in accordance with y=O content ×16/(28+O content ×16).

The characterization method for the Si crystallite grain size of the material is as follows: Scanning was performed within the 2-Theta range of 10°-90° using an X-ray diffractometer, then fitting was performed within the 2-Theta range of 26°-30° to obtain the half-peak width of the Si (111) peak, and the Si crystallite grain size was calculated by Scherrer formula.

The first capacity and the first efficiency of the material were both characterized by using a button cell, wherein the counter electrode was a metal lithium sheet, the charge-discharge rate was 0.1 C, and the charge-discharge voltage ranged from 0.005 V-1.5 V.

The cycle and expansion performances of the material were both characterized by using a button cell. By mixing the material with graphite according to the ratio of material: graphite=1:9 (mass ratio) and then coating the mixture onto a copper foil, the electrode plate was prepared and the thickness of the electrode plate was measured.

Thereafter, the button cell was assembled by using a metal lithium sheet as the counter electrode.

The cyclic charge-discharge rates were as follows: 0.1 C at the 1st cycle, 0.2 C at the 2nd cycle, 0.5 C at the 3rd cycle, 1.0 C at the 4th—50th cycle, and the cell was discharged at 0.1 C to 0.005 V at the 51st cycle; then the cell was disassembled for testing the thickness of the electrode plate. The charge and discharge voltages for all cycles ranged from 0.005 V-1.5V.

The capacity retention rate after 50 cycles refers to the ratio of the charge capacity of the 50th cycle to that of the 1st cycle.

The expansion rate of the electrode plate refers to (thickness of electrode plate after cycling—thickness of electrode plate before cycling)/(thickness of the electrode plate before cycling—thickness of copper foil).

Example 1

Preparation of $SiO_y$ (1) 880 g of $SiO_x$-based composite material (which was a composite material formed from an amorphous carbon coating and commercially available $SiO_x$ (x=1), wherein the amorphous carbon accounted for 3 wt % of the composite material) and 120 g of Mg powder were mixed Mg accounted for 12% of the mixture) in a VC mixer for 30 min, then the mixture was fed into a box-type furnace with Ar atmosphere of 0.1 MPa for treating at 1000° C. for 12 h, and products (reduced $SiO_y$ material and Mg compound) were obtained.

(2) Acid treatment was performed on the products obtained in step (1) by using HCl for 2 h, followed by filtering to separate the acid liquor, then the filter residue was baked at high temperature, and then a anode material of lithium ion battery was obtained.

Characterization Results:

The O content was obtained from characterization by an N/H/O analyzer, and y=0.37 for the anode material of lithium ion battery obtained in this example.

The Si crystallite grain size of $SiO_y$ was obtained as 9.8 nm from characterization by an X-ray diffractometer.

A button cell was assembled by using the material for characterization, of which button cell the first capacity was 1,281 mAh/g and the first efficiency was 83.1%.

The material was mixed with graphite to assemble a button cell, of which the capacity retention rate was 95% and the expansion rate of the electrode plate was 49% after 50 cycles.

Example 2

Preparation of $SiO_y$ the process was the same as that in Example 1, except that: 960 g of $SiO_x$-based composite material (which was a composite material formed from an amorphous carbon coating and commercially available $SiO_x$ (x=1), wherein the amorphous carbon accounted for 3 wt % of the composite material) and 40 g of Mg powder were taken for the experiment, that is, Mg accounted for 4% of the mixture.

Characterization Results:

The O content was obtained from characterization by an N/H/O analyzer, and y=0.78 for the anode material of lithium ion battery obtained in this example.

The Si crystallite grain size of $SiO_y$ was obtained as 4.5 nm from characterization by an X-ray diffractometer.

A button cell was assembled by using the material for characterization, of which button cell the first capacity was 1,465 mAh/g and the first efficiency was 80.1%.

The material was mixed with graphite to assemble a button cell, of which the capacity retention rate was 97% and the expansion rate of the electrode plate was 42% after 50 cycles.

Example 3

Preparation of $SiO_y$ the process was the same as that in Example 2, except that:

the mixture resulted from mixing $SiO_x$ with Mg in a VC mixer was fed into a box-type furnace with $N_2$ atmosphere of 0.1 MPa for treating at 1000° C. for 12 h.

Characterization Results:

The O content was obtained from characterization by an N/H/O analyzer, and y=0.79 for the anode material of lithium ion battery obtained in this example.

The Si crystallite grain size of $SiO_y$ was obtained as 4.6 nm from characterization by an X-ray diffractometer.

A button cell was assembled using the material for characterization, of which button cell the first capacity was 1,471 mAh/g and the first efficiency was 79.9%.

The material was mixed with graphite to assemble a button cell, of which the capacity retention rate was 97% and the expansion rate of the electrode plate was 42% after 50 cycles.

Example 4

Preparation of $SiO_y$ the process was the same as that in Example 1, except that: 960 g of $SiO_x$-based composite material (which was a composite material formed from an amorphous carbon coating and commercially available $SiO_x$ (x=1), wherein the amorphous carbon accounted for 3 wt % of the composite material) and 40 g of Al powder were taken for the experiment, that is, Al accounted for 4% of the mixture.

Characterization Results:

The O content was obtained from characterization by an N/H/O analyzer, and y=0.35 for the anode material of lithium ion battery obtained in this example.

The Si crystallite grain size of $SiO_y$ was obtained as 5.2 nm from characterization by an X-ray diffractometer.

A button cell was assembled using the material for characterization, of which button cell the first capacity was 1,379 mAh/g and the first efficiency was 86.4%.

The material was mixed with graphite to assemble a button cell, of which the capacity retention rate was 94% and the expansion rate of the electrode plate was 48% after 50 cycles.

Example 5

Preparation of $SiO_y$ the process was the same as that in Example 1, except that:

the mixture resulted from mixing $SiO_x$ with Mg in a VC mixer was fed into vacuum with Ar atmosphere of 0.02 MPa for treating at 1000° C. for 12 h.

Characterization Results:

The O content was obtained from characterization by an N/H/O analyzer, and y=0.37 for the anode material of lithium ion battery obtained in this example.

The Si crystallite grain size of $SiO_y$ was obtained as 9.5 nm from characterization by an X-ray diffractometer.

A button cell was assembled using the material for characterization, of which button cell the first capacity was 1,307 mAh/g and the first efficiency was 83.3%.

The material was mixed with graphite to assemble a button cell, of which the capacity retention rate was 95% and the expansion rate of the electrode plate was 49% after 50 cycles.

Example 6

Preparation of $SiO_y$ the process was the same as that in Example 1, except that:

the mixture resulted from mixing $SiO_x$ with Mg in a VC mixer was fed into vacuum with Ar atmosphere of 0.1 MPa for treating at 800° C. for 12 h.

Characterization Results:

The O content was obtained from characterization by an N/H/O analyzer, and y=0.51 for the anode material of lithium ion battery obtained in this example.

The Si crystallite grain size of $SiO_y$ was obtained as 6.6 nm from characterization by an X-ray diffractometer.

A button cell was assembled using the material for characterization, of which button cell the first capacity was 1,321 mAh/g and the first efficiency was 81.8%.

The material was mixed with graphite to assemble a button cell, of which the capacity retention rate was 97% and the expansion rate of the electrode plate was 45% after 50 cycles.

Example 7

Preparation of $SiO_y$ the product obtained in step (1) of Example 2 was used as the raw material for step (1), and the operation of step (1) was repeated once, then step (2) was completed to obtain $SiO_y$.

Characterization Results:

The O content was obtained from characterization by an N/H/O analyzer, and y=0.53 for the anode material of lithium ion battery obtained in this example.

The Si crystallite grain size of $SiO_y$ was obtained as 5.2 nm from characterization by an X-ray diffractometer.

A button cell was assembled using the material for characterization, of which button cell the first capacity was 1,395 mAh/g and the first efficiency was 81.4%.

The material was mixed with graphite to assemble a button cell, of which the capacity retention rate was 96% and the expansion rate of the electrode plate was 44% after 50 cycles.

As can be seen from Example 1 to Example 7, $SiO_y$ having various y values can be obtained by various processing conditions from the $SiO_x$ material having various x values and various metals (Mg, Al, etc.) added in various proportions. Further, the obtained $SiO_y$ has high first efficiency, high first capacity and meanwhile excellent cycle performance and small volume effect.

Comparative Example 1 the process was the same as that in Example 1, except that: 500 g of $SiO_x$-based composite material (which was a composite material formed from an amorphous carbon coating and commercially available SiO, wherein the amorphous carbon accounted for 3 wt % of the composite material) and 500 g of Mg powder were taken for the experiment, that is, Mg accounted for 50 wt % of the mixture.

Characterization Results:

The O content was obtained from characterization by an N/H/O analyzer, and y=0 for the anode material of lithium ion battery obtained in this example.

The Si crystallite grain size of $SiO_y$ was obtained as 63.5 nm from characterization by an X-ray diffractometer.

A button cell was assembled using the material for characterization, of which button cell the first capacity was 1,235 mAh/g and the first efficiency was 88.4%.

The material was mixed with graphite to assemble a button cell, of which the capacity retention rate was 82% and the expansion rate of the electrode plate was 71% after 50 cycles.

The applicant states that the present application illustrates the detailed methods of the present application by way of the above examples, but the present application is not limited to the above detailed methods. That is, it does not mean that the present application must be implemented depending on the above detailed methods.

What is claimed is:

1. An anode material of lithium ion battery, comprising $SiO_y$ and an M compound, with M being a metal;
   wherein $0.2<y<0.9$;
   wherein the M compound is contained in an amount of 3%-15% by mass percentage based on the total mass of the anode material being 100%; and
   wherein the anode material has a first coulombic efficiency ranging from 79.9%-86.4%.

2. The anode material according to claim 1, wherein the anode material has a specific surface area of $\leq 50$ m$^2$/g.

3. The anode material according to claim 1, wherein Si crystallite grains in the $SiO_y$ have a size of $\leq 100$ nm.

4. The anode material according to claim 1, wherein M is an active metal with a pauling electronegativity of $\leq 1.8$.

5. The anode material according to claim 1, wherein M includes any one selected from the group consisting of metal Na, metal K, metal Mg, metal Ca and metal Al, or M includes a combination of at least two selected from the group consisting of metal Na, metal K, metal Mg, metal Ca and metal Al.

6. The anode material according to claim 1, wherein the anode material further comprises any one selected from the group consisting of amorphous carbon coating, graphite, carbon black, carbon nanotubes, graphene, silicon, and a metal compound, or the anode material further comprises a combination of at least two selected from the group consisting of amorphous carbon coating, graphite, carbon black, carbon nanotubes, graphene, silicon, and a metal compound.

7. The anode material according to claim 5, wherein the metal compound comprises any one selected from the group consisting of a metal oxide, a metal silicide and a metal silicate, or the metal compound comprises a combination of at least two selected from the group consisting of a metal oxide, a metal silicide and a metal silicate.

8. The anode material according to claim 5, wherein the metal compound comprises any one selected from the group consisting of $K_2O$, $Na_2O$, $MgO$, $CaO$, $Al_2O_3$, $Mg_2Si$, $Ca_2Si$, $Al_4Si_3$, $K_2SiO_3$, $K_4SiO_4$, $K_2Si_2O_5$, $Na_2SiO_3$, $Na_4SiO_4$, $Na_2Si_2O_5$, $Mg_2SiO_4$, $MgSiO_3$, $Ca_2SiO_4$, $CaSiO_3$, $Al_4(SiO_4)_3$, and $Al_2(SiO_3)_3$, or the metal compound comprises a combination of at least two selected from the group consisting of $K_2O$, $Na_2O$, $MgO$, $CaO$, $Al_2O_3$, $Mg_2Si$, $Ca_2Si$, $Al_4Si_3$, $K_2SiO_3$, $K_4SiO_4$, $K_2Si_2O_5$, $Na_2SiO_3$, $Na_4SiO_4$, $Na_2Si_2O_5$, $Mg_2SiO_4$, $MgSiO_3$, $Ca_2SiO_4$, $CaSiO_3$, $Al_4(SiO_4)_3$, and $Al_2(SiO_3)_3$.

9. A preparation method of the anode material of lithium ion battery according to claim 1, comprising:
   performing a redox reaction on a raw material containing $SiO_x$ material and the metal M, with the result that the O/Si ratio of the $SiO_x$ material is adjusted from x to y, while the metal M is oxidized to obtain the M compound;
   wherein $0.5<x<1.5$, $0.2<y<0.9$, and $y<x$.

10. The method according to claim 9, further comprising the following steps:
    (1) mixing the raw material containing the $SiO_x$ material and the metal M uniformly, then subjecting the mixture to heat treatment and heat preservation under a non-oxidizing atmosphere to obtain $SiO_y$ as a reduction product and the M compound as an oxidation product; wherein the metal M is contained in an amount of 3%-40% by mass percentage based on the total mass of the raw material containing the $SiO_x$ material and the metal M being 100%;
    (2) subjecting the products obtained in step (1) to acid treatment by using an acid for dissolving and partially removing the M compound, and a lithium ion battery material comprising $SiO_y$ and the M compound is obtained;
    wherein $0.5<x<1.5$, $0.2<y<0.9$, and $y<x$.

11. The method according to claim 9, wherein Si crystallite grains in the raw material comprising the $SiO_x$ material in step (1) have a size of $\leq 100$ nm.

12. The method according to claim 10, wherein it further comprises the steps of liquid-solid separation and washing and drying the separated solid phase after the acid treatment.

13. The method according to claim 10, wherein it further comprises using the product of step (1) and/or the product of step (2) as the raw material for step (1) and repeating the following steps: step (1), or step (1) and step (2) in sequence.

14. The method according to claim 10, wherein the raw material containing the $SiO_x$ material in step (1) further contains an additive to form a $SiO_x$-based composite material with the $SiO_x$ material, wherein the additive is any one selected from the group consisting of amorphous carbon coating, graphite, carbon black, carbon nanotubes, graphene, silicon, and a metal salt, or the additive is a combination of at least two selected from the group consisting of amorphous carbon coating, graphite, carbon black, carbon nanotubes, graphene, silicon, and a metal salt.

15. The method according to claim 10, wherein the metal M in step (1) is an active metal with a pauling electronegativity of $\leq 1.8$.

16. The method according to claim 10, wherein the metal M in step (1) includes any one selected from the group consisting of metal Na, metal K, metal Mg, metal Ca and metal Al, or the metal M in step (1) includes a combination of at least two selected from the group consisting of metal Na, metal K, metal Mg, metal Ca and metal Al.

17. The method according to claim 10, wherein the metal M has a particle size D50 of $\leq 300$ μm.

18. The method according to claim 9, wherein a heat treatment temperature in step (1) is 550° C.-1100° C.

* * * * *